US012608634B2

(12) United States Patent
Coady et al.

(10) Patent No.: US 12,608,634 B2
(45) Date of Patent: Apr. 21, 2026

(54) DISTRIBUTED QUANTUM FILE CONSOLIDATION

(71) Applicant: Red Hat, Inc., Raleigh, NC (US)

(72) Inventors: Stephen Coady, Waterford City (IE);
Leigh Griffin, Waterford City (IE)

(73) Assignee: Red Hat, LLC, Raleigh, NC (US)

( * ) Notice: Subject to any disclaimer, the term of this patent is extended or adjusted under 35 U.S.C. 154(b) by 1406 days.

(21) Appl. No.: 17/159,842

(22) Filed: Jan. 27, 2021

(65) Prior Publication Data

US 2022/0237490 A1     Jul. 28, 2022

(51) Int. Cl.
*G06N 10/00*     (2022.01)
*G06F 16/182*     (2019.01)
*G06F 21/74*     (2013.01)

(52) U.S. Cl.
CPC ........... *G06N 10/00* (2019.01); *G06F 16/182* (2019.01); *G06F 21/74* (2013.01)

(58) Field of Classification Search
CPC ...... G06N 10/00; G06N 10/80; G06F 16/182; G06F 21/74
See application file for complete search history.

(56) References Cited

U.S. PATENT DOCUMENTS 5,740,367 A * 4/1998 Spilo ................... G06F 12/0815
                                              709/201
2011/0072229 A1* 3/2011 Hara ..................... G06F 3/0617
                                              711/E12.001

2021/0200870 A1* 7/2021 Yavo ................... H04L 63/1416
2021/0255871 A1* 8/2021 Kayiran ..................... G06F 8/41
2021/0279625 A1* 9/2021 Shani ...................... G06F 15/16

OTHER PUBLICATIONS

Superuser, Microsoft Office Document is "Locked for Editing by 'Another User'", archive captured Aug. 23, 2019, https://web.archive.org/web/20190823104201/https://superuser.com/questions/30980/microsoft-office-document-is-locked-for-editing-by-another-user. (Year: 2019).*
Wright et al., "Benchmarking an 11-Qubit Quantum Computer," in 10.1 Nature Comms. 5464 (2019). (Year: 2019).*
Author Unknown, "Classical channel," Quantiki—Quantum Information Portal and Wiki, https://www.quantiki.org/wiki/classical-channel, Oct. 26, 2015, 1 page.

(Continued)

*Primary Examiner* — Ryan C Vaughn
(74) *Attorney, Agent, or Firm* — Dority & Manning, P.A.

(57)     ABSTRACT

Distributed quantum file consolidation is disclosed. A controlling quantum computing system (QCS) determines to consolidate a quantum file that includes a plurality of qubits implemented on a plurality of quantum computing systems (QCSs) onto a target QCS, the plurality of qubits including at least a first qubit implemented on a first QCS of the plurality of QCSs. The controlling QCS causes a transfer of quantum information contained in each qubit of the plurality of qubits that is not currently implemented on the target QCS to a corresponding qubit on the target QCS. Quantum file update information that indicates the qubits that compose the quantum file are located on the target QCS is communicated to at least the first QCS.

18 Claims, 9 Drawing Sheets

(56)     References Cited

OTHER PUBLICATIONS

Author Unknown, "Quantum transfer at the push of a button," ScienceDaily, https://www.sciencedaily.com/releases/2018/06/180614213700.htm, Jun. 14, 2018, 4 pages.

Jiang, Min et al., "A centralized quantum switch network based on probabilistic channels," Quantum Information Processing 12, 395-410 (2013), https://link.springer.com/article/10.1007/s11128-012-0384-9, Mar. 13, 2012, 12 pages.

* cited by examiner

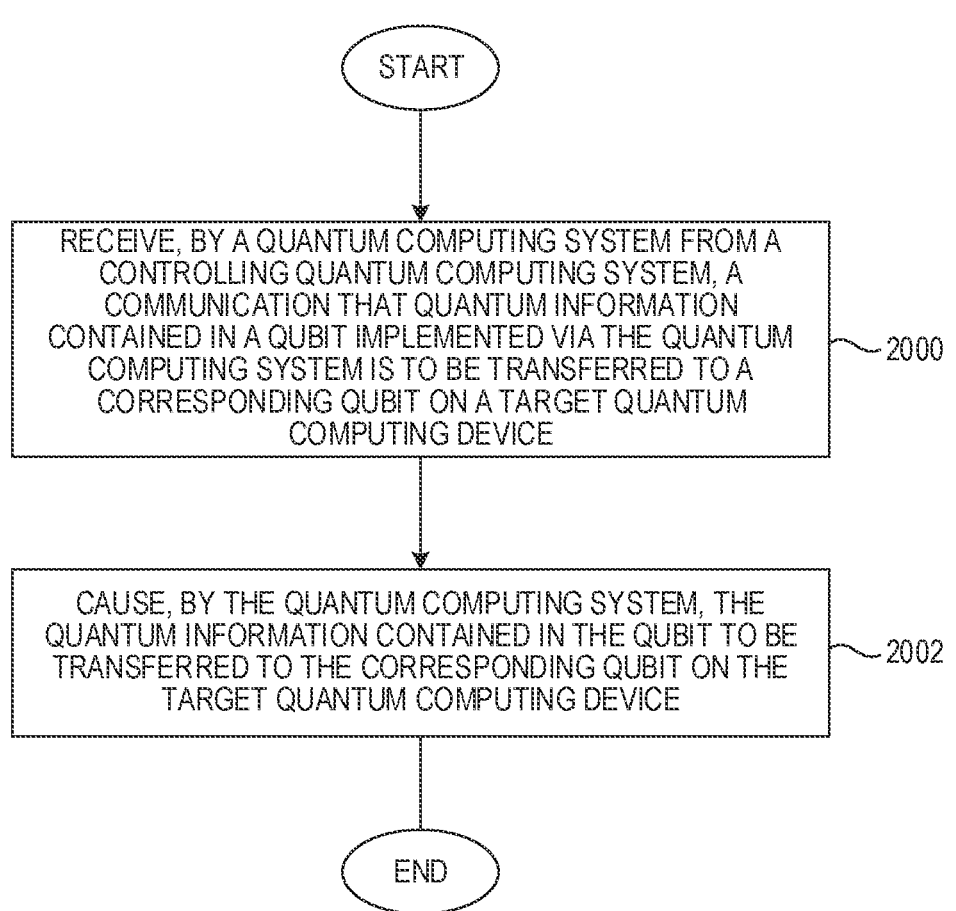

START

RECEIVE, BY A QUANTUM COMPUTING SYSTEM FROM A CONTROLLING QUANTUM COMPUTING SYSTEM, A COMMUNICATION THAT QUANTUM INFORMATION CONTAINED IN A QUBIT IMPLEMENTED VIA THE QUANTUM COMPUTING SYSTEM IS TO BE TRANSFERRED TO A CORRESPONDING QUBIT ON A TARGET QUANTUM COMPUTING DEVICE ~2000

CAUSE, BY THE QUANTUM COMPUTING SYSTEM, THE QUANTUM INFORMATION CONTAINED IN THE QUBIT TO BE TRANSFERRED TO THE CORRESPONDING QUBIT ON THE TARGET QUANTUM COMPUTING DEVICE ~2002

END

*FIG. 4*

DISTRIBUTED QUANTUM FILE CONSOLIDATION

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement mechanisms for quantum file consolidation such that a distributed quantum file that includes qubits that are implemented on a plurality of different quantum computing systems can be consolidated onto a single quantum computing system.

In one example a method is provided. The method includes determining, by a controlling quantum computing system (QCS), to consolidate a quantum file that comprises a plurality of qubits implemented on a plurality of quantum computing systems (QCSs) onto a target QCS, the plurality of qubits including at least a first qubit implemented on a first QCS of the plurality of QCSs. The method further includes causing, by the controlling QCS, a transfer of quantum information contained in each qubit of the plurality of qubits that is not currently implemented on the target QCS to a corresponding qubit on the target QCS. The method further includes communicating, to at least the first QCS, quantum file update information that indicates the qubits that compose the quantum file are located on the target QCS.

In another example a quantum computing system is provided. The quantum computing system includes a memory and a processor device coupled to the memory to determine to consolidate a quantum file that comprises a plurality of qubits implemented on a plurality of quantum computing systems (QCSs) onto a target QCS, the plurality of qubits including at least a first qubit implemented on a first QCS of the plurality of QCSs, the target QCS being a different QCS than the quantum computing system. The processor device is further to cause a transfer of quantum information contained in each qubit of the plurality of qubits that is not currently implemented on the target QCS to a corresponding qubit on the target QCS. The processor device is further to communicate, to at least the first QCS, quantum file update information that indicates the qubits that compose the quantum file are located on the target QCS.

In another example a non-transitory computer-readable storage medium is provided. The non-transitory computer-readable storage medium includes executable instructions to cause a processor device to determine to consolidate a quantum file that comprises a plurality of qubits implemented on a plurality of quantum computing systems (QCSs) onto a target QCS, the plurality of qubits including at least a first qubit implemented on a first QCS of the plurality of QCSs. The instructions further cause the processor device to cause a transfer of each qubit of the plurality of qubits that is not currently implemented on the target QCS to a corresponding qubit on the target QCS. The instructions further cause the processor device to communicate, to at least the first QCS, quantum file update information that indicates the qubits that compose the quantum file are located on the target QCS.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4 is a flowchart of a method of distributed quantum file consolidation from a perspective of a quantum computing system that is transferring quantum information from the quantum computing system to a target quantum computing system according to one example;

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, an ability to programmatically coordinate access to qubits will be desirable.

U.S. patent application Ser. No. 16/859,571, the disclosure of which is hereby incorporated herein by reference in its entirety, discloses a quantum file management system that operates to create distributed quantum files that comprise a plurality of qubits that may be implemented by a plurality of different quantum computing systems. It may be desirable at times to consolidate a distributed quantum file onto a single quantum computing system, for purposes of security, processing efficiency, fault tolerance, or the like. The examples disclosed herein implement mechanisms for quantum file consolidation such that a distributed quantum file that includes qubits that are implemented on a plurality of different quantum computing systems can be consolidated onto a single quantum computing system.

Figure 1A:
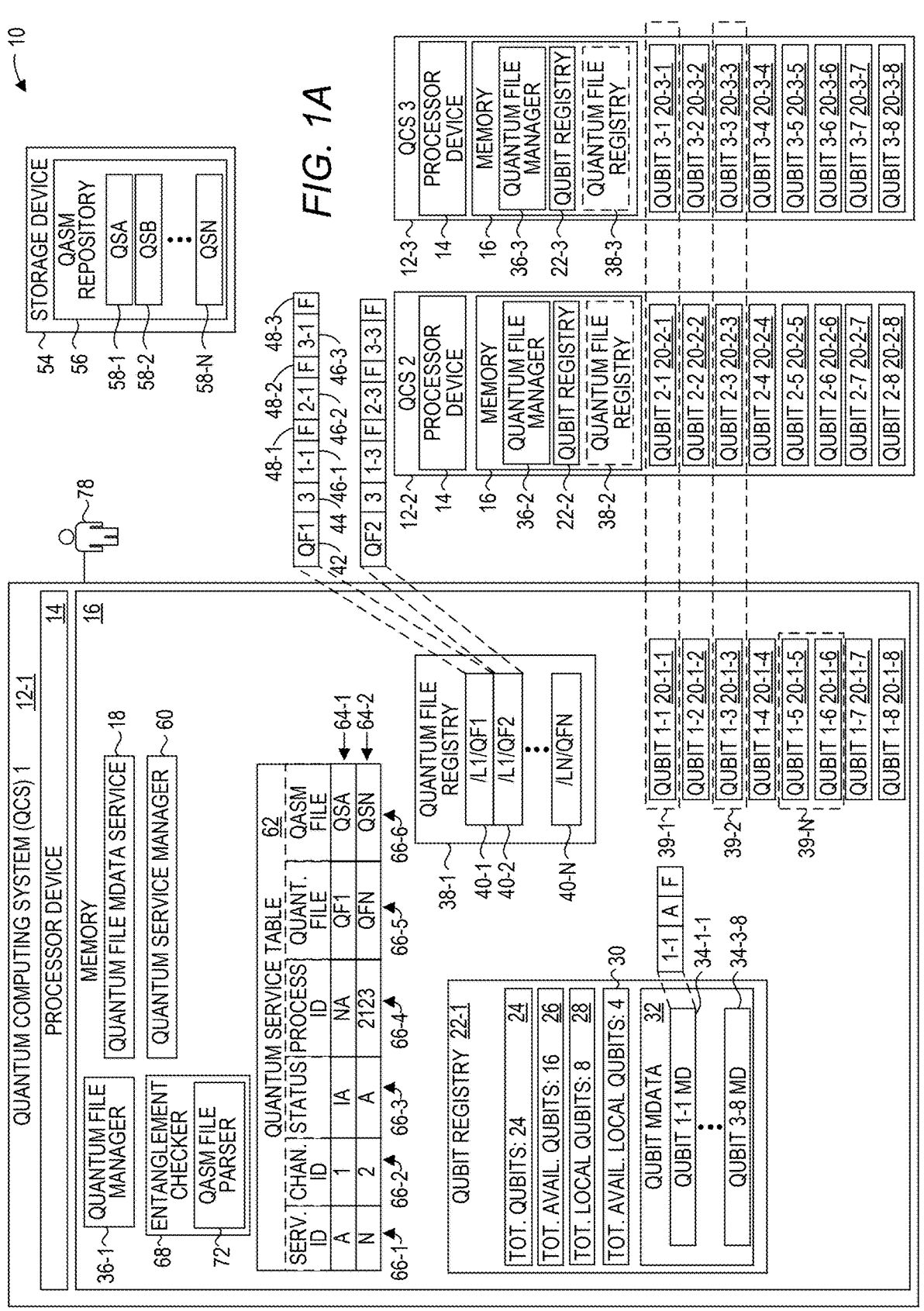
FIGS. 1A-1B are block diagrams of an environment in which examples can be practiced.
Figure 1B:
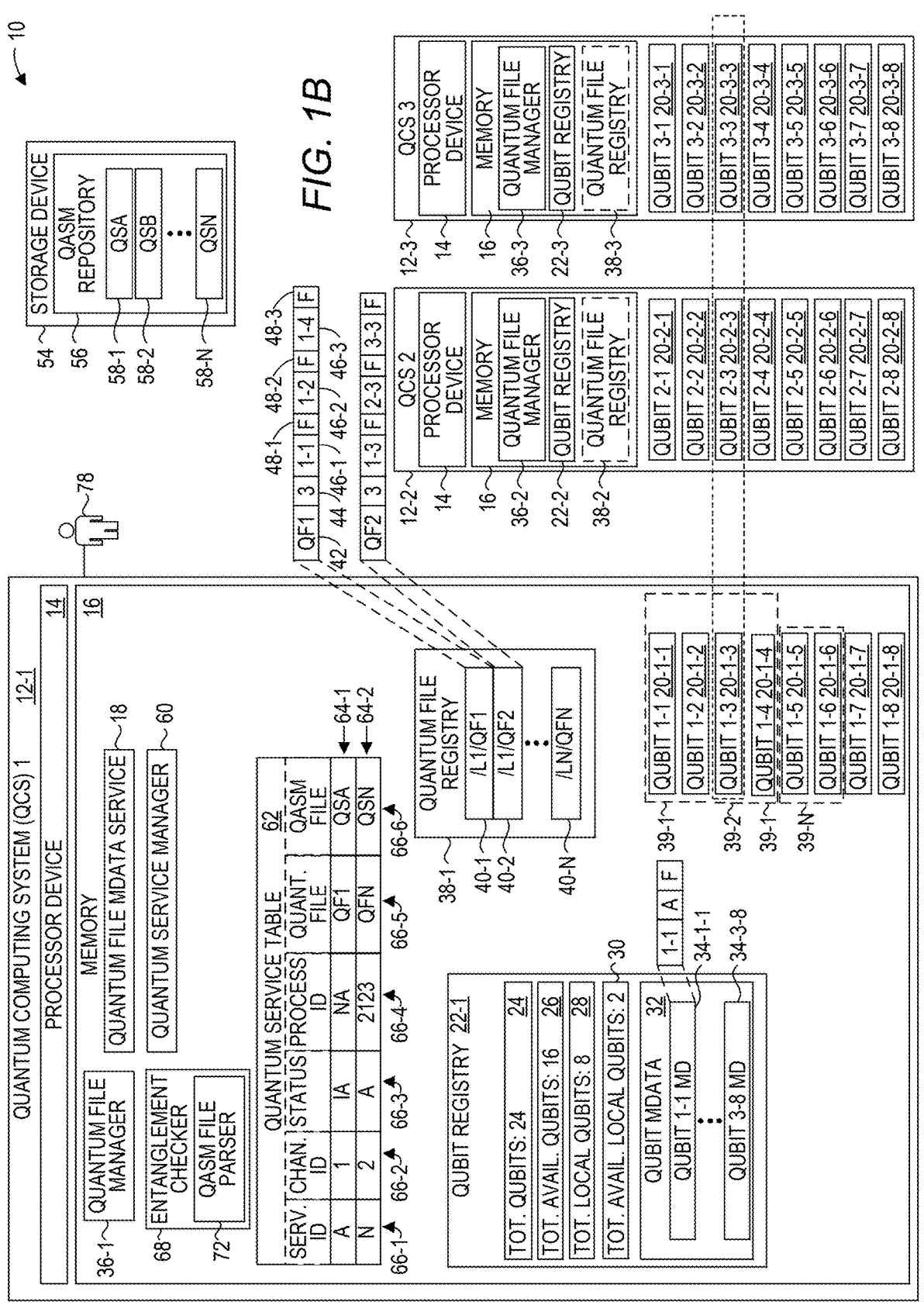

FIGS. 1A-1B are block diagrams of an environment 10 in which examples may be practiced. Referring first to FIG. 1A, the environment 10 includes a plurality of quantum computing systems 12-1, 12-2 and 12-3 (generally, quantum computing systems 12). The quantum computing systems 12 may be close in physical proximity to one another, or may be relatively long distances from one another, such as hundreds or thousands of miles from one another. The quantum computing systems 12 operate in quantum environments but can operate using classical computing principles or quantum computing principles. When using quantum computing principles, the quantum computing systems 12 perform computations that utilize quantum-mechanical phenomena, such as superposition and entanglement. The quantum computing systems 12 may operate under certain environmental conditions, such as at or near 0° Kelvin. When using classical computing principles, the quantum computing systems 12 utilize binary digits that have a value of either 1 or 0. While only three quantum computing systems 12 are illustrated due to space considerations, any number of quantum computing systems 12 may communicate with one another to implement the functionality discussed herein. Moreover, while, for space considerations, only the quantum computing system 12-1 is illustrated with certain components, the quantum computing systems 12-2 and 12-3 may have similar components as those described herein with regard to the quantum computing system 12-1.

Each of the quantum computing systems 12 includes at least one processor device 14 and at least one memory 16. A number of example components of the quantum computing system 12-1 will be described herein, first briefly, then in greater detail below. The quantum computing system 12-1 includes a quantum file metadata service 18 that operates to obtain quantum file metadata about one or more quantum files. The phrase "quantum file metadata" refers to information that relates to a particular quantum file 39, such as a file name, a creation date of the quantum file 39, a last access date of the quantum file 39, or some other attribute relating to the quantum file 39. Quantum file metadata are information about the quantum file 39 and are separate from the content (e.g., data) stored in the quantum file 39 itself.

The quantum computing system 12-1 implements eight qubits 20-1-1-20-1-8; the quantum computing system 12-2 implements eight qubits 20-2-1-20-2-8; and the quantum computing system 12-3 implements eight qubits 20-3-1-20-3-8. The quantum computing system 12-1 includes a qubit registry 22-1 which maintains information about the qubits 20-1-1-20-3-8, including, by way of non-limiting example, a total qubits counter 24 that maintains count of the total number of qubits 20 implemented by the quantum computing systems 12-1-12-3, a total available qubits counter 26 that maintains count of the total number of qubits that are currently available for allocation, a total local qubits counter 28 that maintains count of the total number of qubits implemented by the quantum computing system 12-1 only, and a total available local qubits counter 30 that maintains count of the total number of qubits 20 that are currently available for allocation on the quantum computing system 12-1.

The qubit registry 22-1 also maintains qubit metadata 32, which comprise a plurality of metadata records 34-1-1-34-3-8, each of which maintains information about a corresponding qubit 20-1-1-20-3-8, such as, by way of non-limiting example, an identifier of the corresponding qubit 20-1-1-20-3-8, a quantum service identifier of the quantum service currently using the corresponding qubit 20-1-1-20-3-8, whether the corresponding qubit 20-1-1-20-3-8 is currently in an entangled state, or the like. The quantum computing systems 12-2 and 12-3 may also include qubit registries 22-2 and 22-3, respectively, that maintain qubit metadata about the qubits 20-1-1-20-3-8. As changes to the qubits 20-1-1-20-1-8 occur, the qubit registry 22-1 may generate and transmit qubit update record(s) to the quantum computing systems 12-2 and 12-3 so that the quantum computing systems 12-2 and 12-3 maintain up-to-date qubit metadata about the qubits 20-1-1-20-3-8 in the respective qubit registries 22-2 and 22-3. The qubit registries 22-2-22-3 on the quantum computing systems 12-2 and 12-3 similarly generate and transmit qubit update record(s) upon changes to the qubits 20 implemented on the respective quantum computing systems 12-2 and 12-3, so that each of the quantum computing systems 12-1-12-3 maintains up-to-date metadata about the qubits 20-1-1-20-3-8.

The quantum computing system 12-1 controls access, at least in part, to the qubits 20-1-1-20-3-8 via a quantum file structure that is controlled by a quantum file management system. The quantum file management system includes a quantum file manager 36-1 and a quantum file registry 38-1. The quantum file registry 38-1 includes metadata regarding, in this example, a plurality of quantum files 39-1, 39-2 and 39-N (generally, quantum files 39) implemented in the quantum computing systems 12-1-12-3. The quantum file registry 38-1 includes a plurality of quantum file records 40-1, 40-2-40-N (generally, quantum file records 40), each of which corresponds to and identifies a corresponding quantum file 39-1, 39-2, 39-N implemented on one or more of the quantum computing systems 12-1-12-3. Each quantum file 39 comprises one or more of the qubits 20-1-1-20-3-8, and each of the qubits 20-1-1-20-3-8 corresponds, at a given point in time, to at most only one quantum file 39. Each respective quantum file record 40 includes quantum file metadata describing attributes of the respective quantum file 39 that corresponds to the respective quantum file record 40. The quantum file record 40-1 defines a quantum file having an identifier of QF1. In some implementations the quantum file registry 38 may be centralized, and in other implementations the quantum file registry 38 may be distributed on each of the quantum computing systems 12-1-12-3.

The quantum file management system may implement a folder (e.g., directory) system via which quantum files 39 may be logically organized in different folders. In this example, the quantum files 39-1, 39-2 are organized in a folder "L1", and the quantum file 39-N is organized in a folder "LN".

As an example of the content of a quantum file record 40, the quantum file record 40-1 includes an internal identifier field 42 that identifies the quantum file 39-1 ("QF1"). A size field 44 identifies the number of qubits 20 that make up the quantum file 39-1. The quantum file record 40-1 contains, for each qubit 20 that makes up the quantum file 39-1, a qubit identification field and an entanglement status field. In this example, a qubit identification field 46-1 contains a qubit identifier (1-1) that identifies the qubit 20-1-1 implemented by the quantum computing system 12-1; an entanglement field 48-1 indicates that the qubit 20-1-1 is not currently in an entangled state with any other qubit; a qubit identification field 46-2 contains a qubit identifier (2-1) that identifies the qubit 20-2-1 implemented by the quantum computing system 12-2; an entanglement field 48-2 that indicates that the qubit 20-2-1 is not currently in an entangled state with any other qubit; a qubit identification field 46-3 contains a qubit identifier (3-1) that identifies the qubit 20-3-1 implemented by the quantum computing system 12-3; and an entanglement field 48-3 indicates that the qubit 20-3-1 is not currently in an entangled state with any other qubit.

Although not illustrated, the quantum file record 40-1 may include any suitable quantum file metadata, such as, by way of non-limiting example, a creation timestamp field that identifies a creation date and time of the quantum file 39-1, a last access timestamp field that identifies a date and time of a last access of the quantum file 39-1, an owner field that identifies an owner of the quantum file 39-1, and the like.

A quantum file 39 may be generated in any of a number of different ways. In one example, an operator 78 may interact with the quantum file manager 36-1 via a user interface to define the quantum file 39. The operator 78 may specify a name for the quantum file 39 and identify the particular qubits 20-1-1-20-3-8 to be used for the quantum file 39, or may request that a particular number of qubits 20 be assigned to the quantum file 39. The quantum file manager 36-1 may access the qubit registry 22-1 to locate available qubits 20, or, if particular qubits 20 have been designated, may access the qubit registry 22-1 to ensure that such qubits 20 are available. The quantum file manager 36-1 may then generate a suitable quantum file record 40 that corresponds to the quantum file 39. The quantum file manager 36-1 also updates the qubit registry 22-1 as appropriate. The qubit registry 22-1 may send qubit update records to the quantum computing systems 12-2 and 12-3. The quantum file manager 36-1 may also send quantum file update records to the quantum computing systems 12-2 and 12-3 that contain information contained in the newly generated quantum file record 40.

The quantum computing system 12-1 includes or is communicatively coupled to one or more storage devices 54. The storage device 54 implements a quantum assembly language (QASM) repository 56 in which a plurality of QASM files 58-1-58-N are stored. The quantum computing system 12-1 is capable of initiating a plurality of different quantum services. The term "quantum service" as used herein refers to a quantum application that accesses one or more of the qubits 20-1-1-20-3-8, typically by reference to a quantum file 39, and provides some desired functionality. Each quantum service is implemented via a corresponding QASM file 58-1-58-N (generally, "QASM files 58"), each of which comprises quantum computing instructions. In this example, the QASM file 58-1 corresponds to a quantum service A; the QASM file 58-2 corresponds to a quantum service B; and the QASM file 58-N corresponds to a quantum service N. This correspondence information may be stored and accessible to components of the quantum computing system 12-1. The QASM files 58 may utilize quantum files to provide a desired function. The QASM files 58 may explicitly identify a quantum file 39 or may be initiated with runtime variables that identify a particular quantum file.

In some implementations, the quantum computing system 12-1 includes a quantum service manager 60 that maintains a quantum service table 62 that includes information that describes a current state of certain quantum services executing on the quantum computing system 12-1. In this example, the quantum service table 62 includes a plurality of rows 64-1-64-2 (generally, rows 64), each of which corresponds to a particular quantum service.

Each row 64 contains six data fields 66-1-66-6. The data field 66-1 identifies the particular quantum service that is associated with that row 64. The data field 66-2 identifies a particular quantum channel utilized by the quantum service that is associated with that row 64. The data field 66-3 identifies a current status of the quantum service associated with that row 64. The data field 66-4 contains a process identifier (ID) associated with the quantum service, if the quantum service is currently active (e.g., executing). The data field 66-5 identifies one or more quantum files 39 used by the quantum service associated with that row 64. The data field 66-6 identifies the QASM file 58 that implements the quantum service associated with that row 64.

At the point in time illustrated in FIG. 1A, the row 64-1 corresponds to the quantum service A. The data field 66-1 of the row 64-1 indicates that the row 64-1 corresponds to the quantum service A. The data field 66-2 of the row 64-1 indicates that the quantum service A utilizes channel 1. The data field 66-3 of the row 64-1 indicates that the quantum service A is currently inactive (i.e., not currently executing). The data field 66-4 identifies a process ID of "NA" for the inactive quantum service A. The data field 66-5 identifies the quantum file 39-1 as a quantum file that is utilized by the service A when active. The data field 66-6 indicates that the service A is implemented by the QASM file 58-1.

The row 64-2 corresponds to the quantum service N, implemented by the QASM file 58-N. The data field 66-1 of the row 64-2 indicates that the row 64-2 corresponds to the quantum service N. The data field 66-2 of the row 64-2 indicates that the quantum service N utilizes channel 2. The data field 66-3 of the row 64-2 indicates that the quantum service N is currently active (i.e., currently executing). The data field 66-4 identifies a process ID of 2123 for the executing quantum service N. The data field 66-5 identifies the quantum file 39-N (QFN) as being utilized by the quantum service N. The data field 66-6 indicates that the quantum service N is implemented by the QASM file 58-N.

The quantum computing system 12-1 may include an entanglement checker 68 that operates to determine whether one or more of the qubits 20-1-1-20-3-8 are entangled. The entanglement checker 68 may determine an entanglement status of one or more of the qubits 20-1-1-20-3-8 periodically, intermittently, upon request, or in response to some event on the quantum computing system 12-1.

The entanglement checker 68 accesses the QASM files 58-1-58-N to determine if the quantum services that utilize the qubits 20-1-1-20-3-8 entangle the qubits 20-1-1-20-3-8. The entanglement checker 68 parses the respective QASM files 58 in accordance with a QASM programming language syntax. The entanglement checker 68 identifies programming instructions that, when executed, cause a qubit 20-1-1-20-3-8 to become entangled. The entanglement checker 68 accesses correspondence information (not illustrated) that identifies the correspondence between the QASM files 58 and the quantum services A-N.

As an example, the entanglement checker 68 may access the row 64-2 of the quantum service table 62 which corresponds to the quantum service N. The entanglement checker 68 may access the data field 66-5 of the row 64-2 of the quantum service table 62 to determine that the quantum service N utilizes the quantum file 39-N, which corresponds to the quantum file record 40-N. The entanglement checker 68 may access the quantum file record 40-N and determine that the quantum file 39-N is composed of the qubits 20-1-5 and 20-1-6. The entanglement checker 68 may access the data field 66-6 of the row 64-2 of the quantum service table 62 to determine that the quantum service N is implemented via the QASM file 58-N.

The entanglement checker 68 accesses the QASM file 58-N. The entanglement checker 68 reads the quantum instructions, parses the quantum instructions in accordance with a syntax of the respective programming language, and analyzes the quantum instructions. Based on a "cx q[1],q[2]" instruction, which utilizes the cnot gate, the entanglement checker 68 makes a determination that, if quantum service N is executing, the qubits 20-1-5 and 20-1-6 are entangled. The entanglement checker 68 accesses the data field 66-3 of the row 64-2 of the quantum service table 62 and determines that the quantum service N is executing. The entanglement checker 68 thus determines that the qubits 20-1-5 and 20-1-6 are entangled. The entanglement checker 68 sends a message to the quantum file registry 38-1 to set the entanglement fields 48-1 and 48-2 of the quantum file record 40-N to a value of T (true) to indicate that both of the qubits 20-1-5 and 20-1-6 are entangled. The entanglement checker 68 may also update the metadata records 34 that correspond to the qubits 20-1-5 and 20-1-6 to indicate that such qubits 20 are entangled.

Under certain circumstances or in response to certain events, the quantum file manager 36-1 may determine to consolidate a distributed quantum file 39, such as the quantum file 39-1 or 39-2, onto a single quantum computing system 12-1-12-3. For example, the quantum file manager 36-1 may receive an instruction from the operator 78 to consolidate a distributed quantum file 39 onto a single quantum computing system 12-1-12-3. In some implementations the quantum file manager 36-1 may consolidate a distributed quantum file 39 onto a single quantum computing system 12-1-12-3 upon a determination that a quantum service requires a secure environment. A distributed quantum file 39 may be consolidated onto a single quantum computing system 12-1-12-3 due to processing efficiencies wherein one or more of the quantum computing systems 12 is a substantial geographic distance from one another, because a quantum computing system 12-1-12-3 is having hardware problems and it is desired to move distributed quantum files 39 off of such quantum computing system 12-1-12-3, or for any other desired or suitable reason.

For purposes of illustration assume that the operator 78 instructs the quantum file manager 36-1 to consolidate the quantum file 39-1 onto the quantum computing system 12-1. In some implementations a quantum file manager 36 may be capable only of consolidating quantum files 39 onto the quantum computing system 12 on which the quantum file manager 36 executes. In other implementations, a quantum file manager 36-1-36-3 on any of the quantum computing systems 12-1-12-3 may be able to consolidate quantum files 39 onto any other of the quantum computing systems 12-1-12-3. The term "target" will be used herein to identify the quantum computing system 12-1-12-3 onto which a quantum file 39 is to be consolidated, and the term "controlling" will be used herein to identify the quantum computing system 12-1-12-3 that controls the quantum file consolidation process. The target quantum computing system 12 and the controlling quantum computing system 12 may be the same quantum computing system 12, or may be different quantum computing systems 12.

In this first example, assume that the operator 78 instructs the quantum file manager 36-1, such as via a user interface, to consolidate the quantum file 39-1 onto the quantum computing system 12-1. Thus, in this example, the quantum computing system 12-1 is both a controlling quantum computing system 12-1 and a target quantum computing system 12-1. The quantum file manager 36-1 accesses the quantum file record 40-1 and determines that the quantum file 29-1 is composed of the qubits 20-1-1, 20-2-1, and 20-3-1. The quantum file manager 36-1 accesses the qubit metadata 32 and determines that the qubit 20-2-1 is implemented on the quantum computing system 12-2 and the qubit 20-3-1 is implemented on the quantum computing system 12-3, and thus are not implemented by the target quantum computing system 12-1. Thus, the quantum file manager 36-1 will need to cause the transfer of quantum information in the qubits 20-2-1-20-3-1 to corresponding qubits 20 on the target quantum computing system 12-1. As will be discussed in greater detail below, the transfer of quantum information can take place via any of several mechanisms. As used herein the term "quantum information" in conjunction with a qubit 20 refers to qubit quantum metadata that describe characteristics of the qubit 20, such as a spin, a direction, a polarization, or the like. The term "quantum information" in conjunction with a qubit 20 also refers to the values (i.e., analogous to 1s and 0s) represented by the qubit 20.

Preliminarily, the quantum file manager 36-1 may determine whether or not the quantum file 39-1 is in use. In some implementations, the quantum file manager 36-1 may communicate with the quantum service manager 60 to determine whether an active quantum service is currently utilizing the quantum file 39-1. If so, the quantum file manager 36-1 may send a message to the operator 78 that the quantum file 39-1 is currently in use and may pause the consolidation of the quantum file 39-1 until the quantum file 39-1 is no longer in use.

In this example, the quantum file 39-1 is not currently in use. The quantum file manager 36-1 may, subsequent to beginning the consolidation process, modify quantum file information that corresponds to the quantum file 39-1 that indicates the quantum file 39-1 is unavailable for access. For example, the quantum file manager 36-1 may modify a field in the quantum file record 40-1 (not illustrated) that indicates that the quantum file 39-1 is unavailable for access. If the quantum file registry 38-1 is distributed onto the quantum computing systems 12-2 and 12-3, the quantum file manager 36-1 may also communicate to the quantum computing systems 12-2 and 12-3 a quantum file update record that indicates that the quantum file 39-1 is unavailable for access so that the quantum computing systems 12-2 and 12-3 may update their quantum file registries 38-2 and 38-3, respectively. In some implementations, the quantum file manager 36-1 may also cause the qubit metadata 32 that correspond to the qubits 20-1-1, 20-2-1 and 20-3-1 to indicate that the qubits 20-1-1, 20-2-1 and 20-3-1 are unavailable. The qubit registry 22-1 may send qubit update records to the quantum computing systems 12-2 and 12-3 to indicate the qubits 20-1-1, 20-2-1, and 20-3-1 are unavailable.

The particular quantum information transfer mechanism utilized by the quantum file manager 36-1 to cause the quantum information contained in the qubits 20-2-1 and 20-3-1 to be transferred to corresponding qubits on the quantum computing system 12-1 may be determined in any number of ways. In some implementations, a predetermined quantum information transfer mechanism may be utilized consistently. In other implementations, the quantum computing system 12-1 may communicate with the quantum computing systems 12-2 and 12-3 to select a particular quantum information transfer mechanism. In some implementations, the quantum file manager 36-1 may obtain a selection metric such as a performance metric that quantifies a current performance characteristic of the quantum computing system 12-1 and/or the quantum computing systems 12-2 and 12-3, a network bandwidth metric that quantifies a current available network bandwidth of a network over which the quantum information will be transferred, and/or a distance metric that quantifies a distance between the quantum computing system 12-1 and each of the quantum computing systems 12-2 and 12-3. Based on the selection metric, the quantum computing system 12-1 may select a particular quantum information transfer mechanism of a plurality of different quantum information transfer mechanisms to cause the transfer of quantum information contained in the qubits 20-2-1, 20-3-1 to the corresponding qubits in the quantum computing system 12-1. In some implementations the quantum computing system 12-1 may select different quantum information transfer mechanisms for each of the quantum computing systems 12-2 and 12-3 based on any suitable criteria and/or predetermined configuration.

In this example, the quantum computing system 12-1 and the quantum computing systems 12-2 and 12-3 maintain pairs of qubits in an entangled state to facilitate a transfer of quantum information between the quantum computing systems 12-1-12-3 via a teleportation transfer mechanism. For purposes of illustration, assume that the quantum computing system 12-1 and the quantum computing system 12-2 maintain the qubit 20-1-2 and the qubit 20-2-7 in an entangled state for subsequent teleportation of quantum information. Further assume that the quantum computing system 12-1 determines to cause the transfer of quantum information contained in the qubits 20-2-1 and 20-3-1 to corresponding qubits on the quantum computing system 12-1 via the teleportation transfer mechanism. The quantum file manager 36-1 identifies the qubit 20-1-2 as a pre-entangled qubit that is entangled with the qubit 20-2-7 of the quantum computing system 12-2, and the qubit 20-1-4 as a pre-entangled qubit that is entangled with the qubit 20-3-1 of the quantum computing system 12-3. The quantum file manager 36-1 may send a communication to the quantum computing systems 12-2 and 12-3 to inform the quantum computing systems 12-2 and 12-3 that the quantum information in the qubits 20-2-1 and 20-3-1, respectively, are to be transferred to the quantum computing system 12-1.

The quantum file manager 36-1 causes a teleportation of the quantum information in the qubit 20-2-1 to the qubit 20-1-2. As used herein, "teleportation" refers to a process in which the entangled pair of qubits 20-1-2 and 20-2-7 may be used to transmit quantum information from the quantum computing system 12-2 to the quantum computing system 12-1, without having to transmit the physical embodiment of the qubit 20-2-1. To perform teleportation, in some examples, a Bell measurement operation is performed at the quantum computing system 12-2 using the qubit 20-2-1 and the entangled qubit 20-2-7. The Bell measurement operation on the qubit 20-2-1 and the entangled qubit 20-2-7 results in one (1) of four (4) measurement outcomes and, due to the state of entanglement existing between the qubit 20-2-7 and the qubit 20-1-2, also leaves the qubit 20-1-2 in one (1) of four (4) possible states.

The Bell measurement outcome is subsequently encoded using two (2) classical bits of information, which are then transmitted from the quantum computing system 12-2 to the quantum computing system 12-1 via a communications channel (not illustrated). Based upon the two (2) classical bits encoding the measurement outcome, the quantum computing system 12-1 may modify the entangled qubit 20-1-2 to result in a qubit 20-1-2 that is identical to the qubit 20-2-1. In this manner, the qubit 20-2-1 can be "teleported" from the quantum computing system 12-2 to the quantum computing system 12-1, without having to physically transport the particle embodying the qubit 20-2-1.

The quantum file manager 36-1 interacts with the quantum file manager 36-3 of the quantum computing system 12-3 to cause a teleportation of the quantum information in the qubit 20-3-1 to the qubit 20-1-4 using the pre-entangled pair of qubits in a similar manner.

Referring now to FIG. 1B, the quantum file 39-1 is now composed of the qubits 20-1-1, 20-1-2, and 20-1-4. The quantum file manager 36-1 updates the quantum file record 40-1 to identify the appropriate qubits 20-1-1, 20-1-2, and 20-1-4 as composing the quantum file 39-1, and causes the qubit metadata 32 of the qubits 20-1-1, 20-1-2 and 20-1-4, 20-2-1 and 20-3-1 to be updated to reflect the appropriate status of such qubits 20. The quantum file manager 36-1 also modifies the quantum file record 40-1 to indicate that the quantum file 39-1 is available. The quantum file manager 36-1 may send quantum file update information to the quantum computing systems 12-2 and 12-3 that identifies the new status of the quantum file 39-1, and indicates the qubits 20-1-1, 20-1-2, and 20-1-4 that compose the quantum file 39-1 are located on the quantum computing system 12-1. The qubit registry 22-1 may send qubit update record(s) to the quantum computing systems 12-2 and 12-3 that identify the new status of the qubits 20-1-1, 20-1-2 and 20-1-4, 20-2-1 and 20-3-1.

It is noted that, because the quantum file manager 36-1 is a component of the quantum computing system 12-1, functionality implemented by the quantum file manager 36-1 may be attributed to the quantum computing system 12-1 generally. Moreover, in examples where the quantum file manager 36-1 comprises software instructions that program the processor device 14 to carry out functionality discussed herein, functionality implemented by the quantum file manager 36-1 may be attributed herein to the processor device 14.

Figure 2:
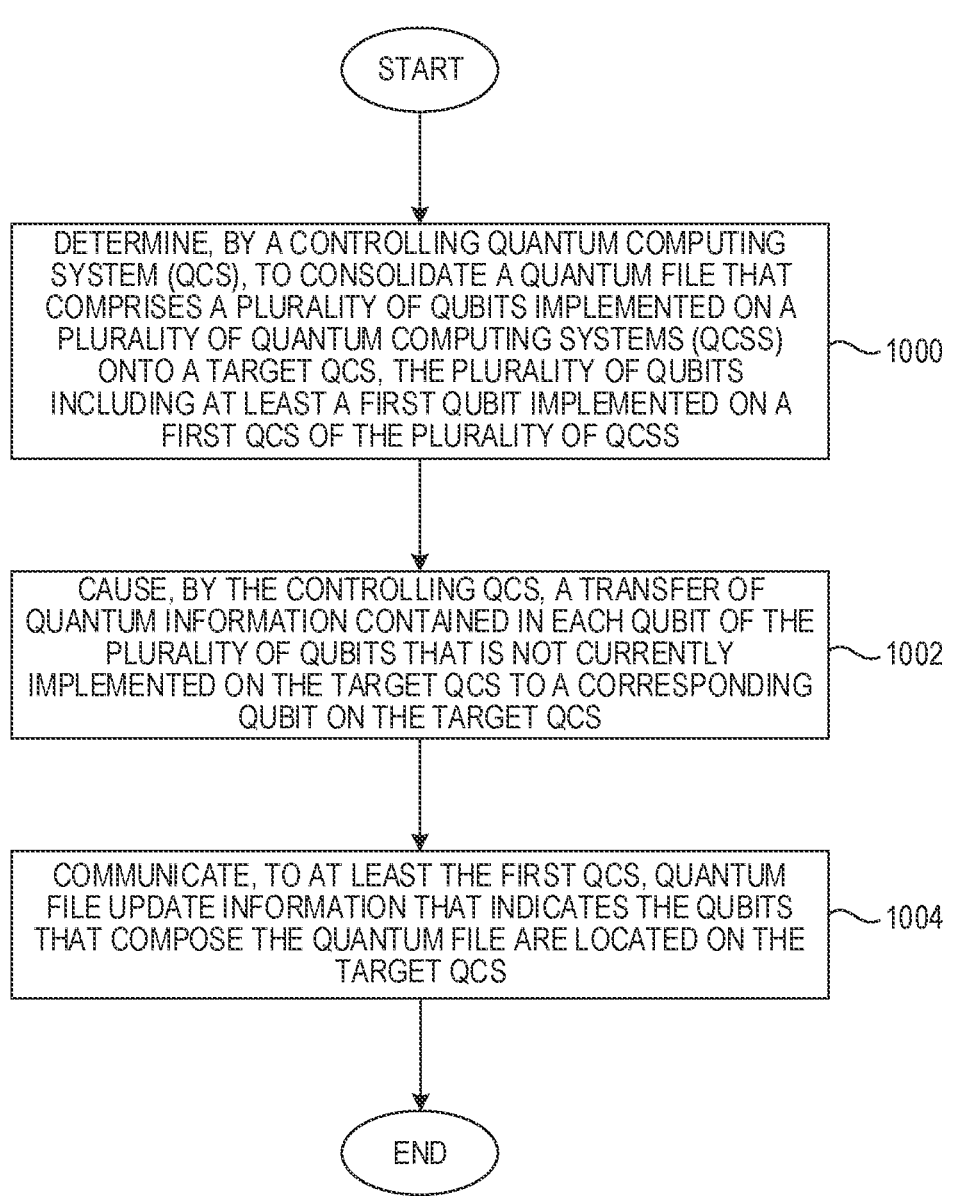
FIG. 2 is a flowchart of a method for distributed quantum file consolidation according to one example.

FIG. 2 is a flowchart of a method for distributed quantum file consolidation according to one example. FIG. 2 will be discussed in conjunction with FIGS. 1A-1B. The controlling quantum computing system (QCS) 12-1 determines to consolidate the quantum file 39-1 that includes the plurality of qubits 20-1-1, 20-2-1, and 20-3-1 implemented on the plurality of quantum computing systems (QCSs) 12-1-12-3 onto the target QCS 12-1, the plurality of qubits 20-1-1, 20-2-1, and 20-3-1 including at least a first qubit 20-2-1 implemented on a first QCS 12-2 of the plurality of QCSs 12-1-12-3 (FIG. 2, block 1000). The controlling QCS 12-1 causes a transfer of quantum information contained in each qubit 20-2-1 and 20-3-1 of the plurality of qubits 20-1-1, 20-2-1, and 20-3-1 that is not currently implemented on the target QCS 12-1 to a corresponding qubit on the target QCS 12-1 (FIG. 2, block 1002). The controlling QCS 12-1 communicates, to at least the first QCS 12-2, quantum file update information that indicates the qubits 20-1-1, 20-1-2 and 20-1-4 that compose the quantum file 39-1 are located on the target QCS 12-1 (FIG. 2, block 1004).

Figure 3:
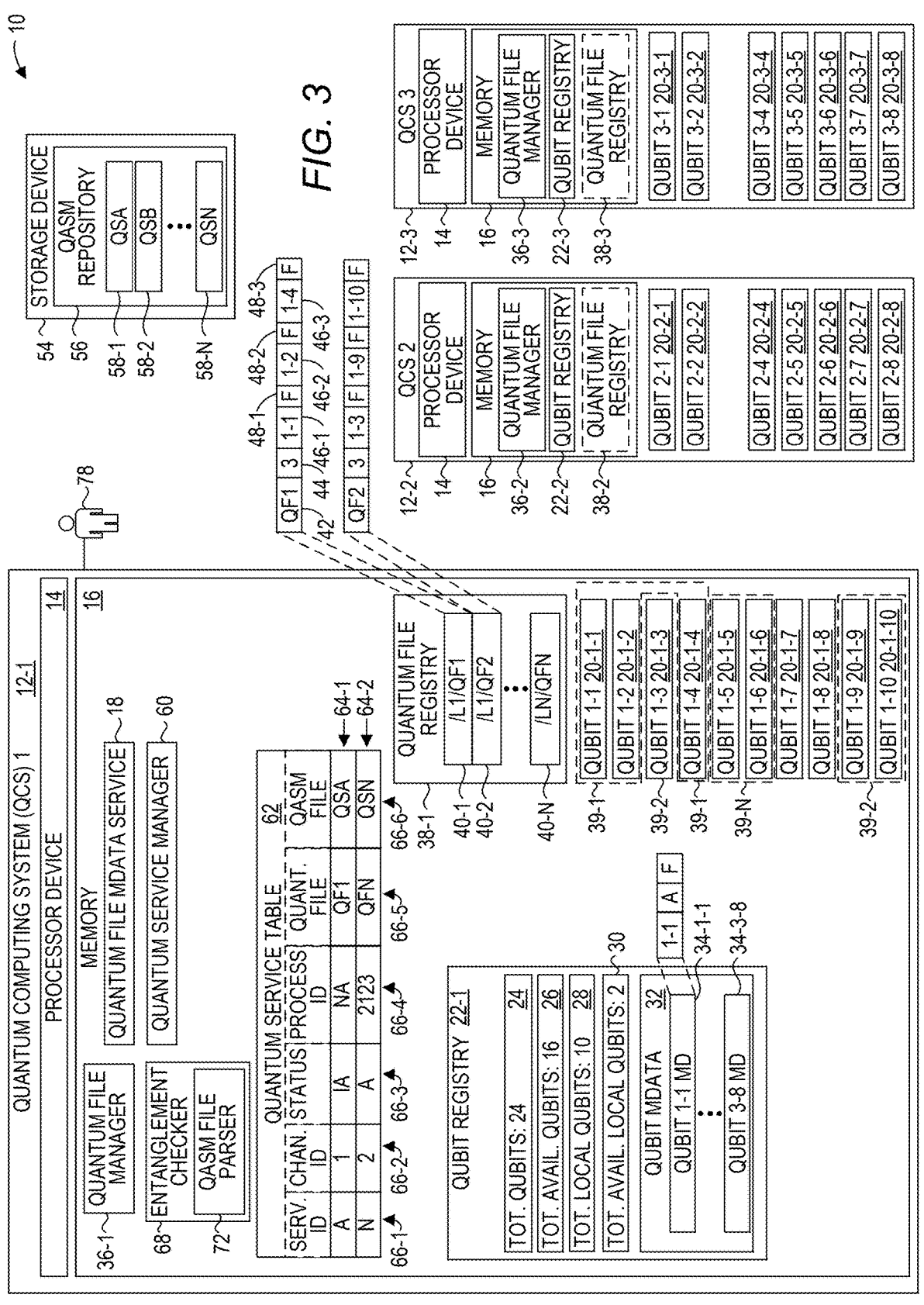
FIG. 3 is a block diagram of the environment illustrated in FIGS. 1A-1B at a point in time subsequent to that illustrated in FIG. 1B.

FIG. 3 is a block diagram of the environment 10 at a point in time subsequent to that illustrated in FIG. 1B. In this second example, assume that the operator 78 instructs the quantum file manager 36-1 to consolidate the quantum file 39-2 onto the quantum computing system 12-1. Thus, again, in this example, the quantum computing system 12-1 is both a controlling quantum computing system 12-1 and a target quantum computing system 12-1; however, as discussed above, in other examples the controlling quantum computing system 12 and the target quantum computing system 12 may be different quantum computing systems.

The quantum file manager 36-1 accesses the quantum file record 40-2 and determines that the quantum file 39-2 is composed of the qubits 20-1-3, 20-2-3 and 20-3-3. The quantum file manager 36-1 accesses the qubit metadata 32 and determines that the qubit 20-2-3 is implemented on the quantum computing system 12-2 and the qubit 20-3-3 is implemented on the quantum computing system 12-3, and thus are not implemented on the target quantum computing system 12-1. Thus, the quantum file manager 36-1 will need to cause the transfer of quantum information in the qubits 20-2-3 and 20-3-3 to corresponding qubits 20 on the target quantum computing system 12-1.

Preliminarily, the quantum file manager 36-1 may determine whether or not the quantum file 39-2 is in use, as discussed above with respect to FIG. 1A and the quantum file 39-1. In this example, the quantum file 39-2 is not currently in use. The quantum file manager 36-1 may modify quantum file information that corresponds to the quantum file 39-2 that indicates the quantum file 39-2 is unavailable for access. If the quantum file registry 38-1 is distributed onto the quantum computing systems 12-2 and 12-3, the quantum file manager 36-1 may also communicate to the quantum computing systems 12-2 and 12-3 a quantum file update record that indicates that the quantum file 39-2 is unavailable for access so that the quantum computing systems 12-2 and 12-3 may update their quantum file registries 38-2 and 38-3, respectively. In some implementations, the quantum file manager 36-1 may also cause the qubit metadata 32 that correspond to the qubits 20-1-3, 20-2-3, and 20-3-3 to indicate that the qubits 20-1-3, 20-2-3, and 20-3-3 are unavailable. The qubit registry 22-1 may send qubit update records to the quantum computing system 12-2 and 12-3 to indicate the qubits 20-1-3, 20-2-3, and 20-3-3 are unavailable.

In this example, the quantum file manager 36-1 determines to cause the transfer of quantum information contained in the qubits 20-2-3 and 20-3-3 to corresponding qubits on the quantum computing system 12-1 via a quantum information transfer mechanism that involves moving the qubits 20-2-3 and 20-3-3 from the quantum computing systems 12-2 and 12-3, respectively, to the quantum computing system 12-1. The quantum computing system 12-1 communicates a message to the quantum computing system 12-2 that the qubit 20-2-3 is to be moved to the quantum computing system 12-1. The message may identify a particular quantum channel of one or more quantum channels (not illustrated) between the quantum computing system 12-1 and the quantum computing system 12-2. The physical particle that composes the qubit 20-2-3 is then communicated via the quantum channel from the quantum computing system 12-2 to the quantum computing system 12-1, to become a qubit 20-1-9 of the quantum computing system 12-1. Similarly, the quantum computing system 12-1 communicates a message to the quantum computing system 12-3 that the qubit 20-3-3 is to be moved to the quantum computing system 12-1. The message may identify a particular quantum channel of one or more quantum channels (not illustrated) between the quantum computing system 12-1 and the quantum computing system 12-3. The physical particle that composes the qubit 20-3-3 is then communicated via the quantum channel from the quantum computing system 12-2 to the quantum computing system 12-1, to become a qubit 20-1-10 of the quantum computing system 12-1.

After the consolidation, the quantum file 39-2 is composed of the qubits 20-1-3, 20-1-9, and 20-1-10. The quantum file manager 36-1 updates the quantum file record 40-2 to identify the appropriate qubits 20-1-3, 20-1-9, and 20-1-10 as composing the quantum file 39-2, and causes the qubit metadata 32 of the qubits 20-1-3, 20-1-9 and 20-1-10, 20-2-3 and 20-3-3 to be updated to reflect the appropriate status of such qubits. The quantum file manager 36-1 also modifies the quantum file record 40-2 to indicate that the quantum file 29-2 is available. The quantum file manager 36-1 may send quantum file update information to the quantum computing systems 12-2 and 12-3 that identifies the new status of the quantum file 39-2, and indicates the qubits 20-1-3, 20-1-9, and 20-1-10 that compose the quantum file 39-2 are located on the quantum computing system 12-1. The qubit registry 22-1 may send qubit update record(s) to the quantum computing systems 12-2 and 12-3 that identify the new status of the qubits 20-1-3, 20-1-9 and 20-1-10, 20-2-3 and 20-3-3.

FIG. 4 is a flowchart of a method of distributed quantum file consolidation from a perspective of a quantum computing system that is transferring quantum information from the quantum computing system to a target quantum computing system according to one example. FIG. 4 will be discussed in conjunction with FIG. 3. The quantum computing system 12-2 receives, from the controlling quantum computing system 12-1, the communication that quantum information contained in the qubit 20-2-3 implemented via the quantum computing system 12-2 is to be transferred to a corresponding qubit on the target quantum computing device 12-1 (FIG. 4, block 2000). The quantum computing system 12-2 causes the quantum information contained in the qubit 20-2-3 to be transferred to the corresponding qubit on the target quantum computing device 12-1 (FIG. 4, block 2002).

Figure 5:
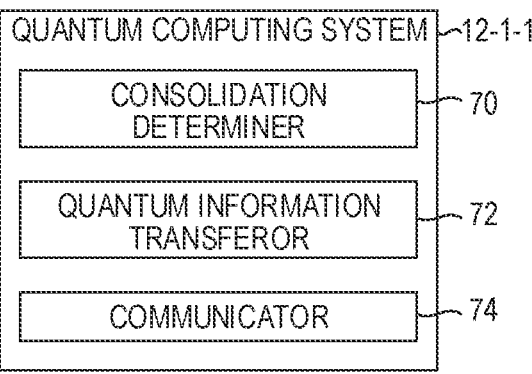
FIG. 5 is a block diagram of a quantum computing system suitable for implementing aspects illustrated in FIGS. 1A-1B according to one implementation.

FIG. 5 is a block diagram of a quantum computing system 12-1-1 according to another implementation. The quantum computing system 12-1-1 implements identical functionality as that described above with regard to the quantum computing system 12-1. The quantum computing system 12-1-1 includes a consolidation determiner 70 to determine to consolidate a quantum file 39 that comprises a plurality of qubits 20 implemented on a plurality of quantum computing systems (QCSs) 12 onto a target QCS 12, the plurality of qubits 20 including at least a first qubit 20 implemented on a first QCS 12 of the plurality of QCSs 12.

The consolidation determiner 70 may comprise executable software instructions configured to program a processor device to implement the functionality of determining to consolidate a quantum file 39, may comprise circuitry including, by way of non-limiting example, an application-specific integrated circuit (ASIC), field-programmable gate array (FPGA), or may comprise a combination of executable software instructions and circuitry. The consolidation determiner 70 may make the determination to consolidate a quantum file 39, by way of non-limiting example, in response to an instruction from an operator, or automatically in response to performance requirements of a quantum service/application, or automatically in response to security requirements of a quantum service/application, or automatically in response to degradation associated with a quantum computing system 12.

The quantum computing system 12-1-1 also includes a quantum information transferor 72 to cause a transfer of quantum information contained in each qubit 20 of the plurality of qubits 20 that is not currently implemented on the target QCS 12 to a corresponding qubit on the target QCS 12. The quantum information transferor 72 may comprise executable software instructions configured to program a processor device to implement the functionality of causing a transfer of quantum information contained in each qubit 20 of the plurality of qubits 20 that is not currently implemented on the target QCS 12 to a corresponding qubit 20 on the target QCS 12, may comprise circuitry including, by way of non-limiting example, an application-specific integrated circuit (ASIC), field-programmable gate array (FPGA), or may comprise a combination of executable software instructions and circuitry. The quantum information transferor 72 may cause the transfer of quantum information in any number of manners, including, by way of non-limiting example, via a qubit teleportation transfer mechanism, a qubit move mechanism, or the like.

The quantum computing system 12-1-1 also includes a communicator 74 to communicate, to at least the first QCS 12, quantum file update information that indicates the qubits 20 that compose the quantum file 39 are located on the target QCS 12. The communicator 74 may comprise executable software instructions configured to program a processor device to implement the functionality of communicating, to at least the first QCS 12, quantum file update information that indicates the qubits 20 that compose the quantum file 39 are located on the target QCS 12, may comprise circuitry including, by way of non-limiting example, an application-specific integrated circuit (ASIC), field-programmable gate array (FPGA), or may comprise a combination of executable software instructions and circuitry. The communicator 74 may communicate the quantum file update information, by way of non-limiting example, via a network transceiver coupled to a network to which the first QCS 12 is also coupled.

Figure 6:
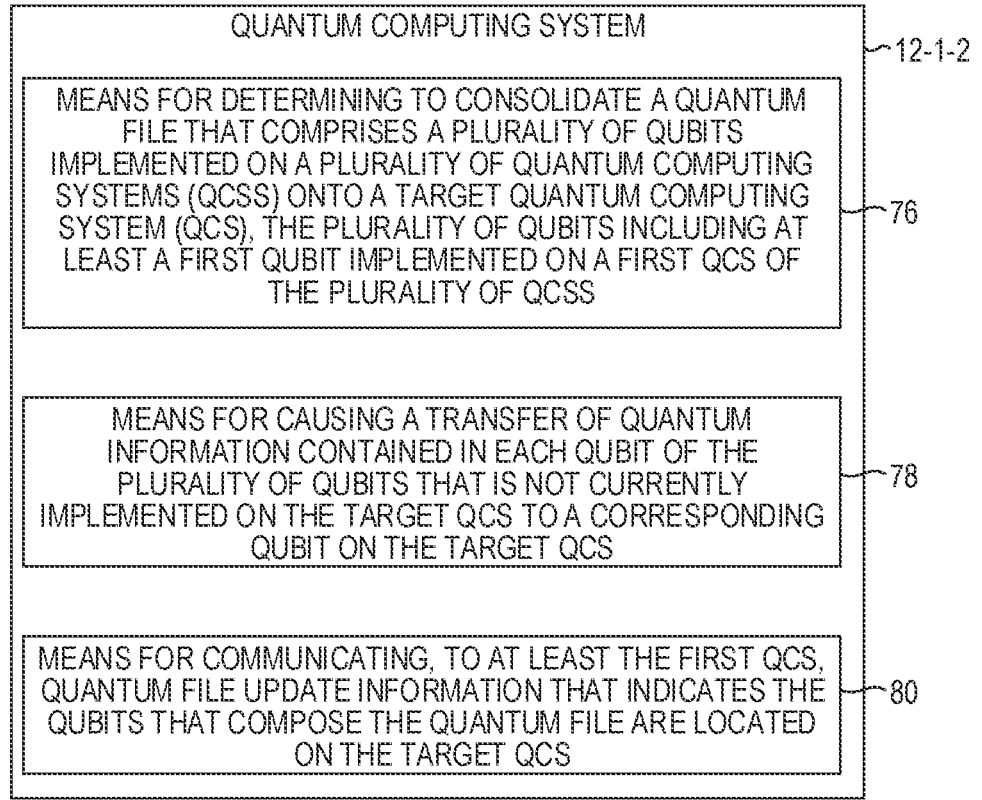
FIG. 6 is a block diagram of a quantum computing system suitable for implementing aspects illustrated in FIGS. 1A-1B according to additional implementations.

FIG. 6 is a block diagram of a quantum computing system 12-1-2 according to another implementation. The quantum computing system 12-1-2 implements identical functionality as that described above with regard to the quantum computing system 12-1. The quantum computing system 12-1-2 includes a means 76 for determining to consolidate a quantum file 39 that comprises a plurality of qubits 20 implemented on a plurality of QCSs 12 onto a target QCS 12, the plurality of qubits 20 including at least a first qubit 20 implemented on a first QCS 12 of the plurality of QCSs 12. The means 76 may be implemented in any number of manners, including, for example, via the consolidation determiner 70 illustrated in FIG. 5.

The quantum computing system 12-1-2 includes a means 78 for causing a transfer of quantum information contained in each qubit 20 of the plurality of qubits 20 that is not currently implemented on the target QCS 12 to a corresponding qubit 20 on the target QCS 12. The means 78 may be implemented in any number of manners, including, for example, via the quantum information transferor 72 illustrated in FIG. 5. The quantum computing system 12-1-2 includes a means 80 for communicating, to at least the first QCS 12, quantum file update information that indicates the qubits 20 that compose the quantum file 39 are located on the target QCS 12. The means 80 may be implemented in any number of manners, including, for example, via the communicator 74 illustrated in FIG. 5.

Figure 7:
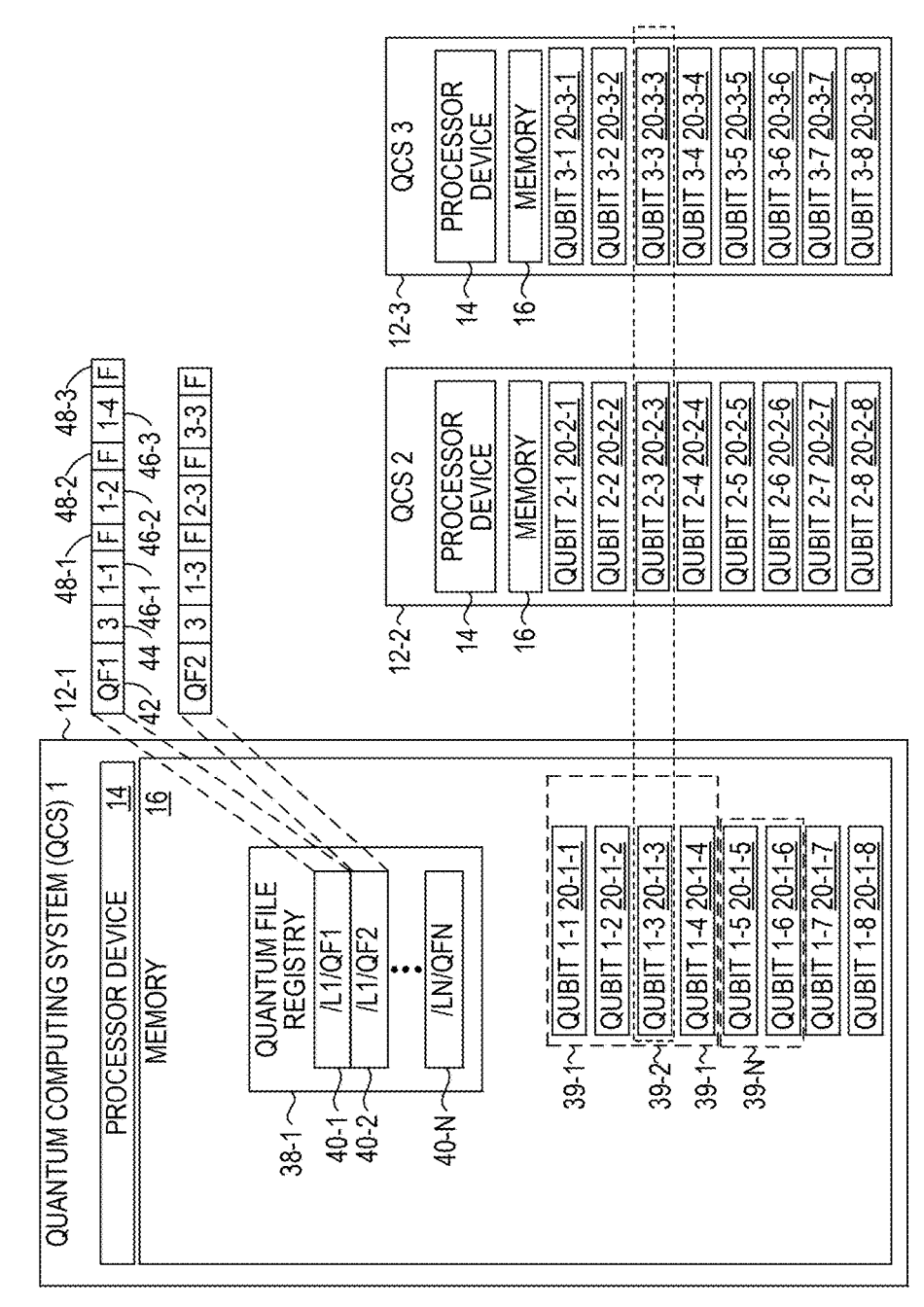
FIG. 7 is a simplified block diagram of the environment illustrated in FIGS. 1A-1B according to another implementation.

FIG. 7 is a simplified block diagram of the environment 10 illustrated in FIGS. 1A-1B according to another implementation. The environment 10 includes the quantum computing system 12-1 which in turn includes the memory 16 and the processor device 14 coupled to the memory 16. The processor device 14 is to determine to consolidate the quantum file 39-1 that includes the plurality of qubits 20-1-1, 20-2-1, and 20-3-1 implemented on the plurality of QCSs 12-1, 12-2, and 12-3 onto the target QCS 12-1, the plurality of qubits 20-1-1, 20-2-1, and 20-3-1 including at least a first qubit 20-2-1 implemented on a first QCS 12-2 of the plurality of QCSs 12-1, 12-2, and 12-3. The processor device 14 is further to cause a transfer of quantum information contained in each qubit 20-2-1, 20-3-1 of the plurality of qubits 20-1-1, 20-2-1, and 20-3-1 that is not currently implemented on the target QCS 12-1 to a corresponding qubit 20-1-2, 20-1-4 on the target QCS 12-1. The processor device 14 is further to communicate, to at least the first QCS 12-2, quantum file update information that indicates the qubits 20-1-1, 20-1-2, and 20-1-4 that compose the quantum file 39-1 are located on the target QCS 12-1.

Figure 8:
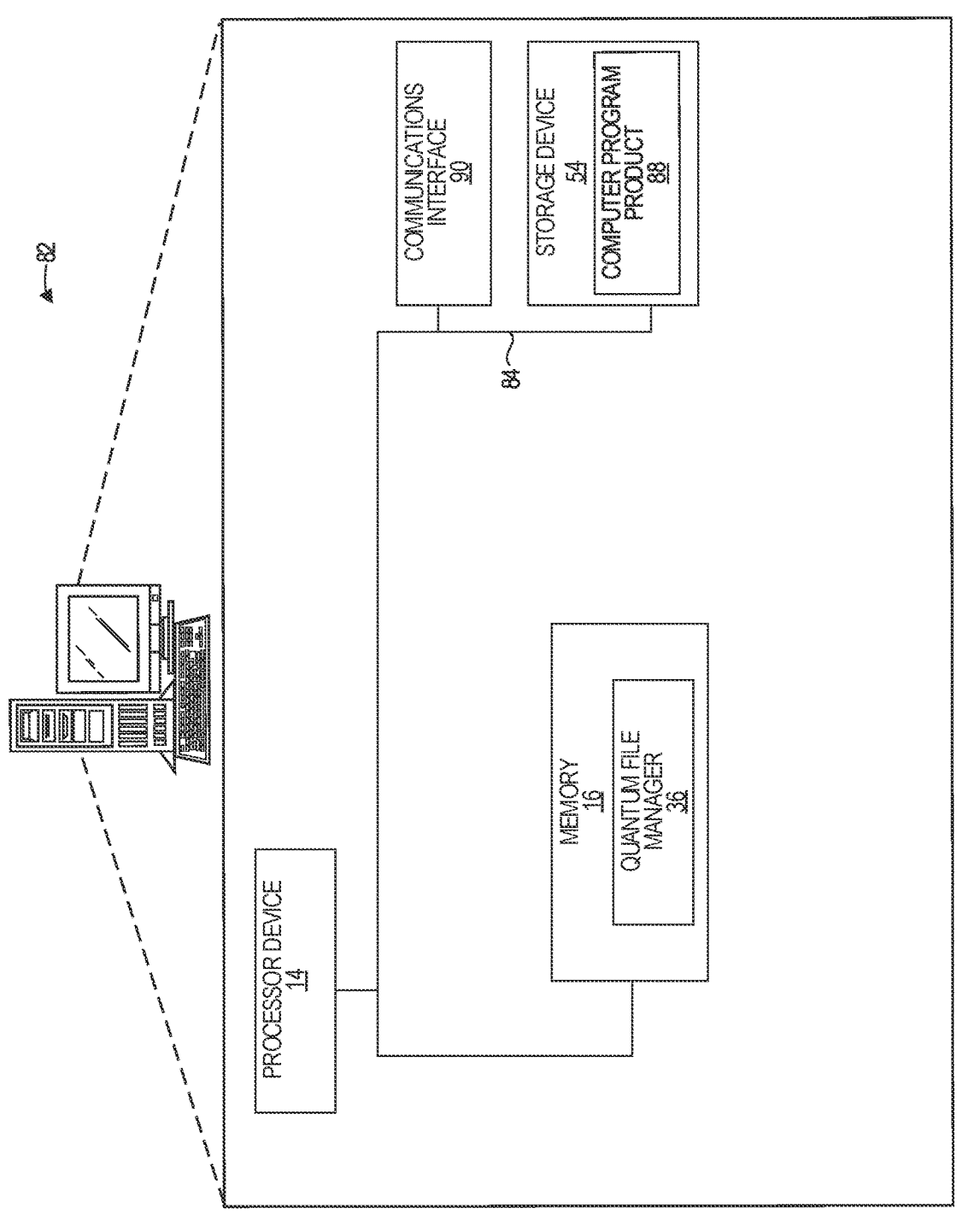
FIG. 8 is a block diagram of a quantum computing system suitable for implementing the quantum computing systems discussed herein.

FIG. 8 is a block diagram of a quantum computing system 82 suitable for implementing the quantum computing systems 12-1-12-3 discussed above. The quantum computing system 82 may comprise any computing or electronic device capable of including firmware, hardware, and/or executing software instructions to implement the functionality described herein in a quantum environment. The quantum computing system 82 includes the one or more processor devices 14, the one or more memories 16 and a system bus 84. The system bus 84 provides an interface for system components including, but not limited to, the one or more memories 16 and the one or more processor devices 14. The processor devices 14 can be any commercially available or proprietary processor suitable for operating in a quantum environment. The quantum computing system 82 may further include or be coupled to a non-transitory computer-readable storage medium such as the storage device 54. The storage device 54 and other drives associated with computer-readable media and computer-usable media may provide non-volatile storage of data, data structures, computer-executable instructions, and the like.

A number of modules can be stored in the storage device 54 and in the memory 16, including the quantum file manager 36. All or a portion of the examples may be implemented as a computer program product 88 stored on a transitory or non-transitory computer-usable or computer-readable storage medium, such as the storage device 54, which includes complex programming instructions, such as complex computer-readable program code, to cause the one or more processor devices 14 to carry out the steps described herein. Thus, the computer-readable program code can comprise software instructions for implementing the functionality of the examples described herein when executed on the one or more processor devices 14.

An operator, such as the operator 78, may also be able to enter one or more configuration commands through a keyboard (not illustrated), a pointing device such as a mouse (not illustrated), or a touch-sensitive surface (not illustrated). The quantum computing system 82 may also include a communications interface 90 suitable for communicating with other computing devices, including, in some implementations, classical computing devices.

Other computer system designs and configurations may also be suitable to implement the systems and methods described herein. The following examples illustrate various additional implementations in accordance with one or more aspects of the disclosure.

Example 1 is a quantum computing system that includes a means for determining to consolidate a quantum file that comprises a plurality of qubits implemented on a plurality of quantum computing systems (QCSs) onto a target quantum computing system (QCS), the plurality of qubits including at least a first qubit implemented on a first QCS of the plurality of QCSs; a means for causing a transfer of quantum information contained in each qubit of the plurality of qubits that is not currently implemented on the target QCS to a corresponding qubit on the target QCS; and a means for communicating, to at least the first QCS, quantum file update information that indicates the qubits that compose the quantum file are located on the target QCS.

Example 2 is a quantum computing system that includes a consolidation determiner to determine to consolidate a quantum file that comprises a plurality of qubits implemented on a plurality of quantum computing systems (QCSs) onto a target QCS, the plurality of qubits including at least a first qubit implemented on a first QCS of the plurality of QCSs; a quantum information transferor to cause a transfer of quantum information contained in each qubit of the plurality of qubits that is not currently implemented on the target QCS to a corresponding qubit on the target QCS; and a communicator to communicate, to at least the first QCS, quantum file update information that indicates the qubits that compose the quantum file are located on the target QCS.

Example 3 is a method that includes receiving, by a quantum computing system from a controlling quantum computing system, a communication that quantum information contained in a qubit implemented via the quantum computing system is to be transferred to a corresponding qubit on a target quantum computing device; and causing, by the quantum computing system, the quantum information contained in the qubit to be transferred to the corresponding qubit on the target quantum computing device.

Example 4 is the method of example 3 further including marking, by the quantum computing system, qubit information that indicates the qubit is unavailable.

Example 5 is the method of example 3 further including determining, by the quantum computing system, that the qubit is one qubit of a plurality of qubits that compose a quantum file; and marking, by the quantum computing system, file registry information to indicate that the quantum file is unavailable.

Example 6 is the method of example 3 further including receiving, from the controlling quantum computing system, a communication that indicates that the quantum information is to be transferred to the corresponding qubit on the target quantum computing device via a teleportation transfer mechanism.

Example 7 is the method of example 6 further including identifying, on the quantum computing system, an available qubit to serve as a teleportation qubit; causing the teleportation qubit to be entangled with a qubit on the target quantum computing system; and causing the teleportation of the qubit to the target quantum computing system via the teleportation qubit.

Example 8 is the method of example 7 wherein the controlling quantum computing system and the target quantum computing system are a same quantum computing system.

Example 9 is the method of example 7 wherein the controlling quantum computing system and the target quantum computing system are different quantum computing systems.

Example 10 is the method of example 3 further including updating qubit information maintained by the quantum computing system to indicate that the qubit is available.

Example 11 is the method of example 3 further including updating quantum file information that corresponds to the quantum file to indicate that the quantum file is no longer composed of the qubit.

Example 12 is the method of example 3 further including receiving, from the target quantum computing system, quantum file update information that identifies a plurality of qubits implemented on the target quantum computing system that compose the quantum file; and updating quantum file information that corresponds to the quantum file to indicate that the quantum file is composed of the plurality of qubits implemented on the target quantum computing system.

Example 13 is the method of example 3 further including receiving, from the controlling quantum computing system, a communication that indicates that the quantum information is to be transferred to the corresponding qubit on the target quantum computing system via moving the qubit to the target quantum computing system.

Example 14 is the method of example 13 further including moving, via a quantum channel, the qubit to the target quantum computing system.

Example 15 is the method of example 14 further including updating qubit information maintained by the quantum computing system to indicate that the qubit is no longer on the quantum computing system.

Example 16 is a quantum computing device that includes a memory; and a processor device communicatively coupled to the memory and configured to: receive, from a controlling quantum computing system, a communication that quantum information contained in a qubit implemented via the quantum computing system is to be transferred to a corresponding qubit on a target quantum computing device; and cause the quantum information contained in the qubit to be transferred to the corresponding qubit on the target quantum computing device.

Individuals will recognize improvements and modifications to the preferred examples of the disclosure. All such improvements and modifications are considered within the scope of the concepts disclosed herein and the claims that follow.

What is claimed is:

1. A method comprising:

initiating, by a controlling quantum computing system (QCS), a quantum service that uses a quantum file, wherein the quantum file comprises a plurality of qubits implemented on a plurality of quantum computing systems (QCSs), the plurality of qubits including at least a first qubit implemented on a first QCS of the plurality of QCSs;

determining, by the controlling OCS, to consolidate the quantum file onto a target QCS based on a security requirement;

determining, by the controlling QCS, a performance metric that quantifies a current performance characteristic of at least one of the target QCS or the controlling QCS;

selecting, by the controlling QCS based on the performance metric, a particular quantum information transfer mechanism from a plurality of quantum information transfer mechanisms, wherein the particular quantum information transfer mechanism is operable to transfer quantum information comprising information descriptive of a state of each qubit of the plurality of qubits;

causing, by the controlling QCS via the particular quantum information transfer mechanism, a transfer of the quantum information contained in each qubit of the plurality of qubits that is not currently implemented on the target QCS to a corresponding qubit on the target QCS; and communicating, by the controlling QCS to at least the first QCS, quantum file update information that indicates the corresponding qubits that compose the quantum file are located on the target QCS.

2. The method of claim 1 wherein causing, by the controlling QCS, the transfer of the quantum information contained in each qubit of the plurality of qubits that is not currently implemented on the target QCS to the corresponding qubit on the target QCS further comprises:

determining which qubits of the plurality of qubits are not on the target QCS;

identifying a plurality of available qubits on the target QCS; and for each qubit of the plurality of qubits that is not currently implemented on the target QCS, moving quantum information contained in the qubit to a corresponding qubit of the plurality of available qubits.

3. The method of claim 2 wherein causing, by the controlling QCS via the particular quantum information transfer mechanism, the transfer of the quantum information contained in each qubit of the plurality of qubits that is not currently implemented on the target QCS to the corresponding qubit on the target QCS further comprises:

causing a transfer of quantum information contained in at least one qubit of the plurality of qubits that is not currently implemented on the target QCS to be moved to a corresponding qubit on the target QCS via a teleportation move mechanism.

4. The method of claim 1 wherein causing, by the controlling QCS via the particular quantum information transfer mechanism, the transfer of the quantum information contained in each qubit of the plurality of qubits that is not currently implemented on the target QCS to the corresponding qubit on the target QCS further comprises:

determining which qubits of the plurality of qubits are not on the target QCS; and moving at least one qubit of the plurality of qubits that are not on the target QCS to the target QCS.

5. The method of claim 4 wherein moving the at least one qubit of the plurality of qubits that are not on the target QCS to the target QCS further comprises causing the at least one qubit of the plurality of qubits to be moved to the target QCS via a quantum channel.

6. The method of claim 1 wherein the controlling QCS and the target QCS are a same QCS.

7. The method of claim 1 wherein the controlling QCS and the target QCS are a same QCS, and further comprising:

obtaining quantum file qubit information that identifies:

the plurality of qubits that compose the quantum file, the plurality of qubits including the first qubit; and for each respective qubit of the plurality of qubits, a QCS of a plurality of QCSs that implements the respective qubit; and wherein causing, by the controlling QCS via the particular quantum information transfer mechanism, the transfer of the quantum information contained in each qubit of the plurality of qubits that is not currently implemented on the target QCS to the corresponding qubit on the target QCS further comprises:

sending a communication to each QCS that implements a qubit that composes the quantum file, other than the controlling QCS, that informs the QCS that the quantum information in the qubit implemented by the QCS is to be transferred to the target QCS.

8. The method of claim 1 further comprising subsequent to determining to consolidate the quantum file, modifying quantum file information that corresponds to the quantum file that indicates the quantum file is unavailable for access.

9. The method of claim 1 further comprising:

subsequent to the quantum file being consolidated, determining that the quantum file is in use; and prior to causing, by the controlling QCS via the particular quantum information transfer mechanism, the transfer of the quantum information, sending a message indicating that the quantum file is in use.

10. The method of claim 1 further comprising, subsequent to causing, by the controlling QCS via the particular quantum information transfer mechanism, the transfer of the quantum information, modifying quantum file information that corresponds to the quantum file that indicates the quantum file is available for access.

11. The method of claim 1 further comprising modifying quantum file information that corresponds to the quantum file to identify each qubit on the target QCS that composes the quantum file.

12. The method of claim 1 wherein determining to consolidate the quantum file comprises receiving an instruction to consolidate the quantum file onto the target QCS.

13. The method of claim 1 wherein determining to consolidate the quantum file comprises determining that the quantum service requires a secure environment.

14. A controlling quantum computing system (QCS) comprising:

a memory; and a processor device coupled to the memory to:

initiate a quantum service that uses a quantum file, wherein the quantum file comprises a plurality of qubits implemented on a plurality of quantum computing systems (QCSs), the plurality of qubits including at least a first qubit implemented on a first QCS of the plurality of QCSs;

determine to consolidate the quantum file onto a target QCS based on a security requirement, determine a performance metric that quantifies a current performance characteristic of at least one of the target QCS or the controlling QCS;

select, based on the performance metric, a particular quantum information transfer mechanism from a plurality of quantum information transfer mechanisms, wherein the particular quantum information transfer mechanism is operable to transfer quantum information comprising information descriptive of a state of each qubit of the plurality of qubits;

cause, via the particular quantum information transfer mechanism, a transfer of the quantum information contained in each qubit of the plurality of qubits that is not currently implemented on the target QCS to a corresponding qubit on the target QCS; and communicate, to at least the first QCS, quantum file update information that indicates the corresponding qubits that compose the quantum file are located on the target QCS.

15. The controlling QCS of claim 14 wherein to cause the transfer of the quantum information contained in each qubit of the plurality of qubits that is not currently implemented on the target QCS to the corresponding qubit on the target QCS, the processor device is further to:

determine which qubits of the plurality of qubits are not on the target QCS;

identify a plurality of available qubits on the target QCS; and for each qubit of the plurality of qubits that is not currently implemented on the target QCS, move quantum information contained in the qubit to a corresponding qubit of the plurality of available qubits.

16. A non-transitory computer-readable storage medium that includes executable instructions to cause a processor device to:

initiate a quantum service that uses a quantum file, wherein the quantum file comprises a plurality of qubits implemented on a plurality of quantum computing systems (QCSs), the plurality of qubits including at least a first qubit implemented on a first QCS of the plurality of QCSs;

determine to consolidate the quantum file onto a target QCS based on a security requirement;

determine a performance metric that quantifies a current performance characteristic of at least one of the plurality of QCSs or the target QCS;

select, based on the performance metric, a particular quantum information transfer mechanism from a plurality of quantum information transfer mechanisms, wherein the particular quantum information transfer mechanism is operable to transfer quantum information comprising information descriptive of a state of each qubit of the plurality of qubits;

cause, via the particular quantum information transfer mechanism, a transfer of the quantum information of each qubit of the plurality of qubits that is not currently implemented on the target QCS to a corresponding qubit on the target QCS; and communicate, to at least the first QCS, quantum file update information that indicates the corresponding qubits that compose the quantum file are located on the target QCS.

17. The non-transitory computer-readable storage medium of claim 16 wherein to cause the transfer of the quantum information contained in each qubit of the plurality of qubits that is not currently implemented on the target QCS to the corresponding qubit on the target QCS, the instructions further cause the processor device to:

determine which qubits of the plurality of qubits are not on the target QCS;

identify a plurality of available qubits on the target QCS; and for each qubit of the plurality of qubits that is not currently implemented on the target QCS, move quantum information contained in the qubit to a corresponding qubit of the plurality of available qubits.

18. The non-transitory computer-readable storage medium of claim 16 wherein to determine to consolidate the quantum file, the instructions further cause the processor device to determine that the quantum service requires a secure environment.

* * * * *